Figure 1:
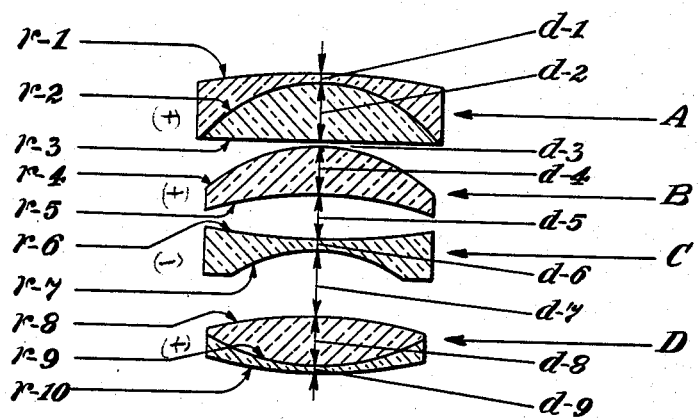

Oct. 28, 1941.                M. A. DURAND                2,260,368
                                LENS SYSTEM
                            Filed Dec. 21, 1940

INVENTOR.
Milo A. Durand
BY
his ATTORNEYS

Patented Oct. 28, 1941

2,260,368

UNITED STATES PATENT OFFICE 2,260,368

LENS SYSTEM

Milo A. Durand, New York, N. Y., assignor to C. P. Goerz American Optical Company, New York, N. Y., a corporation of New York Application December 21, 1940, Serial No. 371,137

8 Claims. (Cl. 88—57)

The present invention relates to improved lens systems suitable for the exacting work of photography, projection, and related arts.

The present day developments in photography, projection, and the related arts, require lens systems of relatively large apertures and which systems are highly corrected for spherical aberrations, coma, astigmatism, field curvature, and color aberrations. The present invention satisfies these requirements to a noteworthy degree.

The present invention may be embodied in a lens system preferably comprising four axially symmetric components, the refracting surfaces of which are spherical, and wherein the said four components are separated by air gaps. The outer components preferably comprise two or more lens elements cemented together, or otherwise placed in intimate contact. The outermost element of each of these two components is a diverging meniscus lens concave toward the interior of the system and the inner elements are such these outer components, as a whole, are converging lenses. Preferably, the refractive index of these outer elements comprising the diverging meniscus lenses, is at least 0.05 less than that of at least one of the related elements of the outer component, to insure existence in each of the outer components of a converging interface concave to the interior of the system.

An example of complete lens system, according to the present invention, is a lens system in which the front component, that is, the component which faces the distant object while in normal use, is a converging doublet lens of which the outer element is a diverging meniscus lens and the inner element of the doublet is a converging lens of refractive index at least 0.05 greater than that of the outer element of the doublet. The second component of the system is a converging meniscus lens concave toward the rear of the system, and may be a simple lens. The third component of the system is a diverging lens which may be a simple lens and which has its more deeply curved face concave toward the rear of the lens system. The fourth or rear component of the system comprises a converging doublet lens, the outside or rear element of which is a diverging meniscus lens concave toward the front of the system, and the innermost or front element of this doublet is a converging lens and has a refractive index of at least 0.05 greater than that of the rear element of this doublet.

Advantages in speed and correction may be obtained by making the front component of a thickness greater than one-tenth the focal length of the entire system and the second component of a thickness greater than one-twentieth the focal length of the entire system, Further advantages in correction and manufacture are to be obtained by so choosing the curves, thicknesses, spacings and refractive indices that the focal length of the combination of the first three components is at least five times that of the entire system in either a positive or negative sense.

Fig. 1 of the drawing illustrates a cross-section on the axis of a lens system in accordance with the present invention, and with the mechanical features of the lens mounting omitted.

Figure 2:
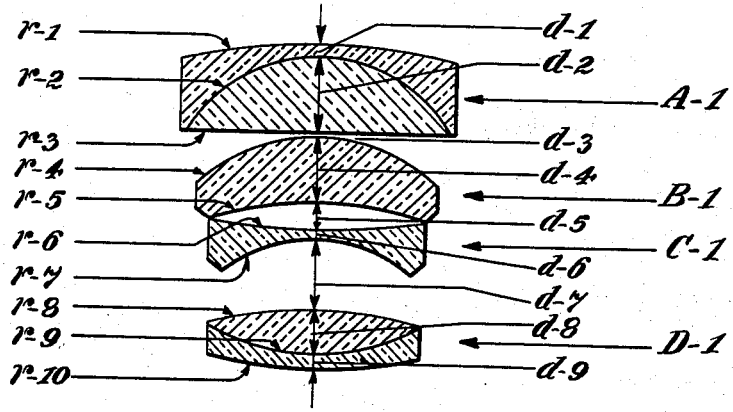

Fig. 2 of the drawing illustrates a cross-section on the axis of a second example of a lens system in accordance with the present invention with the mechanical features of the mounting omitted.

Referring now to the drawing, and more especially to Fig. 1 thereof, a lens system according to the present invention may be obtained by a construction wherein the focal length of the first component A lies between 1.0 and 2.0 times that of the entire system; the focal length of the second component B lies between 0.8 and 2.0 times the entire system; the focal length of the third component C is negative, and lies in magnitude between ⅓ to ½ the focal length of the entire system; and the focal length of the fourth component D is less than that of the entire system. The constructions of the outer components A and D preferably are such that each of these components has a deeply curved interface between two of its elements, which faces are concave toward the interior of the lens system and these interfaces have a converging effect. The radii of these interfaces are preferably less than ½ the focal length of the system and the materials of the lenses are such that the change in refractive index at the interfaces is preferably greater than .05. The same description applies to the components A—I, B—I, C—I, and D—I shown in Fig. 2 of the drawing.

The tables below relate to the lenses illustrated in the drawing, in that Example No. 1 refers to Fig. 1; and Example No. 2 refers to Fig. 2.

The column "Radius" of the Examples 1 and 2 below refers to the radius of the spherical surfaces on the faces of the lenses, as measured in linear units, for example, millimeters. A positive radius indicates a surface concave to the rear of the lens system, and a negative radius indicates a surface concave toward the front of the system.

The column designated "Thickness" refers to the thickness of the lenses, also the air gaps between lenses, as measured on the axis of the lens system, in the same linear units as those used to measure the "Radius."

The term $n_d$ is used to designate the index of refraction of the optical glasses for the lenses, as measured for the yellow "d" line of a helium arc.

The column V designates the "Abbe dispersion constant" for the lens materials used.

The "focal length" is understood as being measured in the same linear units as are used for "Radius" and "Thickness."

Example 1

Focal length 100, relative aperture 1:2.2

|   | Radius | Thickness | $n_d$ (if glass) | V |
|---|---|---|---|---|
| A | $r-1=+121.13$ | $d-1=1.83$ | 1.5317 | 48.9 |
|   | $r-2=+30.71$ | $d-2=11.19$ | 1.6385 | 55.5 |
|   | $r-3=+726.65$ | $d-3=0.10$ | Air | |
| B | $r-4=+36.17$ | $d-4=9.05$ | 1.6204 | 60.3 |
|   | $r-5=+70.53$ | $d-5=8.90$ | Air | |
| C | $r-6=-158.59$ | $d-6=1.83$ | 1.6364 | 35.4 |
|   | $r-7=+30.50$ | $d-7=13.22$ | Air | |
| D | $r-8=+84.36$ | $d-8=9.05$ | 1.6385 | 55.5 |
|   | $r-9=-42.53$ | $d-9=1.83$ | 1.5487 | 45.4 |
|   | $r-10=-86.02$ | | | |

Example 2

Focal length 100, relative aperture 1:1.8

|   | Radius | Thickness | $n_d$ (if glass) | V |
|---|---|---|---|---|
| A-1 | $r-1=+114.00$ | $d-1=1.90$ | 1.5407 | 47.2 |
|   | $r-2=+30.20$ | $d-2=15.00$ | 1.6385 | 55.5 |
|   | $r-3=+714.50$ | $d-3=0.10$ | Air | |
| B-2 | $r-4=+36.22$ | $d-4=13.00$ | 1.6204 | 60.3 |
|   | $r-5=+68.81$ | $d-5=5.05$ | Air | |
| C-3 | $r-6=-155.51$ | $d-6=1.80$ | 1.6211 | 36.2 |
|   | $r-7=+29.67$ | $d-7=14.00$ | Air | |
| C-4 | $r-8=+86.94$ | $d-8=8.90$ | 1.6385 | 55.5 |
|   | $r-9=-40.87$ | $d-9=1.80$ | 1.5407 | 47.2 |
|   | $r-10=-90.05$ | | | |

The above examples are to be understood as being illustrative and are not to be considered in the limiting sense.

A lens system constructed in accordance with the present invention is one wherein the system has an extended field of extreme and uniform sharpness and wherein color corrections are carried out to an extremely high degree. This type of lens is particularly useful in connection with images that are to be reproduced photographically in color.

What I claim is:

1. A lens system comprising four axially symmetrical components axially air spaced apart, the outer components being convergent and comprising two cemented elements, the outermost of said elements of the two components being divergent meniscus lenses concave toward the interior of the system, and the two inner components being simple lens elements, the second component being a converging meniscus lens and the third component being a double concave diverging lens with its most deeply curved surface concave toward the rear component of the system.

2. A lens system as defined in claim 1 in which the focal length of the combination of the first three components is at least five times that of the entire system.

3. A lens system comprising four axially symmetrical components axially air spaced apart, the outer components being convergent and comprising two elements, the outermost of said elements of the two components being divergent meniscus lenses concave toward the interior of the system, the second component being a converging meniscus lens and the third component being a double concave diverging lens with its most deeply curved surface concave toward the rear component of the system.

4. A lens system comprising four components separated by air spaces, the outer components being compounded of lens elements intimately juxtaposed, the outermost element of each of the outer components being a diverging meniscus lens concave to the interior of the system, a converging lens being juxtaposed to each of said outermost element, said outermost element being of a reflective index for yellow light at least 0.05 less than that of the converging lens associated therewith; each outer component as a whole being converging.

5. A lens system comprising four axially symmetrical components axially air spaced apart, the outer components being convergent and comprising two elements, the outermost of said elements of the outer components being divergent meniscus lenses concave toward the interior of the system, the second component being a converging meniscus lens, the third component being a double concave diverging lens with its most deeply curved surface concave toward the rear of the system; with the focal length of the first component between 1.0 and 2.0 times the entire system; the focal length of the second component lying between 0.8 and 2.0 times the entire system; the focal length of the third component being negative and lying in magnitude between one-third and one-half the focal length of the entire system; and the focal length of the fourth component is less than that of the entire system.

6. A photographic lens system in accordance with the following table:

Focal length 100, relative aperture 1:2.2

|   | Radius | Thickness | $n_d$(if glass) | V |
|---|---|---|---|---|
| A | $r-1=+121.13$ | $d-1=1.83$ | 1.5317 | 48.9 |
|   | $r-2=+30.71$ | $d-2=11.19$ | 1.6385 | 55.5 |
|   | $r-3=+726.65$ | $d-3=0.10$ | Air | |
| B | $r-4=+36.17$ | $d-4=9.05$ | 1.6204 | 60.3 |
|   | $r-5=+70.53$ | $d-5=8.90$ | Air | |
| C | $r-6=-158.59$ | $d-6=1.83$ | 1.6364 | 35.4 |
|   | $r-7=+30.50$ | $d-7=13.22$ | Air | |
| D | $r-8=+84.36$ | $d-8=9.05$ | 1.6385 | 55.5 |
|   | $r-9=-42.53$ | $d-9=1.83$ | 1.5487 | 45.4 |
|   | $r-10=-86.02$ | | | | wherein $r$ is the radius of a spherical surface on the face of the lens, and a positive radius indicates a surface concaved to the rear of the lens and a negative radius indicates a surface concave toward the front of the lens; $d$ indicates the thickness of the lens and also the air gaps between the lenses measured on the axis of the lens system; the term $n_d$ designates the index of refraction of the optical glasses used as measured on the yellow "$d$" line of the helium arm; and V designates the Abbe dispersion constant for the lens materials used, the focal length, radius, and thickness, all being measured in the same linear units.

7. A photographic lens system in accordance with the following table:

Focal length 100, relative aperture 1:1.8

|   | Radius | Thickness | $n_d$(if glass) | V |
|---|---|---|---|---|
| A-1 | $r-1=114.00$ | $d-1=1.90$ | 1.5407 | 47.2 |
|   | $r-2=30.20$ | $d-2=15.00$ | 1.6385 | 55.5 |
|   | $r-3=714.50$ | $d-3=0.10$ | Air | |
| B-2 | $r-4=36.22$ | $d-4=13.00$ | 1.6204 | 60.3 |
|   | $r-5=68.81$ | $d-5=5.05$ | Air | |
| C-3 | $r-6=-155.51$ | $d-6=1.80$ | 1.6211 | 36.2 |
|   | $r-7=29.67$ | $d-7=14.00$ | Air | |
| C-4 | $r-8=86.94$ | $d-8=8.90$ | 1.6385 | 55.5 |
|   | $r-9=-40.87$ | $d-9=1.80$ | 1.5407 | 47.2 |
|   | $r-10=-90.05$ | | | | wherein $r$ is the radius of a spherical surface on the face of the lens, and a positive radius indicates a surface concaved to the rear of the lens and a negative radius indicates a surface concave toward the front of the lens; $d$ indicates the thickness of the lens and also the air gaps between the lenses measured on the axis of the lens system; the term $n_d$ designates the index of refraction of the optical glasses used as measured on the yellow "$d$" line of the helium arc; and V designates the Abbe dispersion constant for the lens materials used, the focal length, radius, and thickness, all being measured in the same linear units.

8. A lens system comprising four components separated by air spaces, the front component being composed of a plurality of intimately juxtaposed elements and containing a converging interface concave toward the rear of the system at which interface the change in refractive index for yellow light is at least 0.05, the portion of the front component anterior to this interface being diverging, and the portion posterior to the interface being converging, the front component as a whole being converging; the second component being converging and of the form meniscus concave toward the rear; the third component being diverging; and the fourth component being converging and composed of a plurality of elements intimately juxtaposed and having a converging interface concave to the front of the system at which the change in refractive index for yellow light is at least 0.05, the portion of the fourth component lying anterior to the interface being converging, and the portion of the fourth component posterior to the interface being diverging.

MILO A. DURAND.